C. P. SULLIVAN, Jr.
Variable-Measure.

No. 168,679.

Patented Oct. 11, 1875.

WITNESSES:
E. Wolff
A. F. Terry

INVENTOR:
C. P. Sullivan Jr.
BY Munn & Co.
ATTORNEYS.

UNITED STATES PATENT OFFICE.

CHARLES P. SULLIVAN, JR., OF LINE CREEK, SOUTH CAROLINA.

IMPROVEMENT IN VARIABLE MEASURES.

Specification forming part of Letters Patent No. 168,679, dated October 11, 1875; application filed August 21, 1875.

*To all whom it may concern:*

Be it known that I, CHARLES P. SULLIVAN, Jr., of Line Creek, in the county of Laurens and State of South Carolina, have invented a new and Improved Variable Measure, of which the following is a specification:

This improvement consists of a bottom capable of shifting up and down in the box, and having pins to fasten it in different positions, the pins passing through sides of the box, and also through round sticks set in vertical holes in the box-sides, which have the holes for the different positions made in different lines, so that the sticks turn and close the holes in the box-sides not occupied by the pins, to prevent dirt from getting in and small grains from running out.

Figure 1:
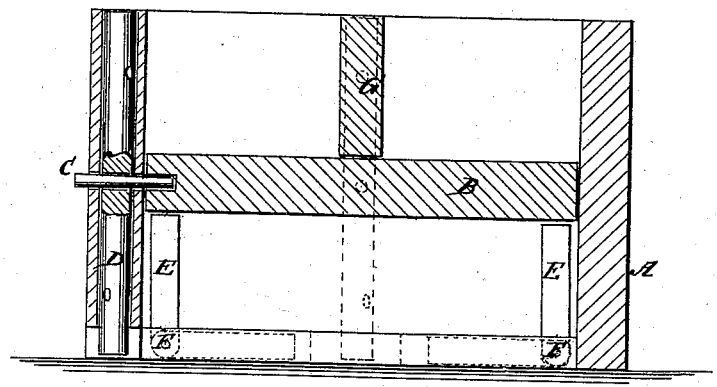
Figure 2:
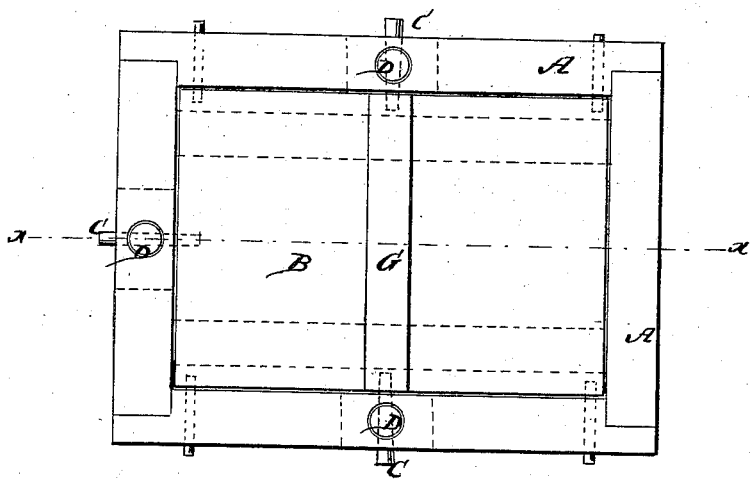

Figure 1 is a sectional elevation of my improved box, taken on the line $x\,x$ of Fig. 2; and Fig. 2 is a plan view.

Similar letters of reference indicate corresponding parts.

A is a box for any standard measure, say half a bushel when the bottom B, which is adjustable, is fixed at the bottom. C represents the pins for holding it in different positions, and D the turning-sticks, fitted in holes in the box-sides for the sticks to pass through, and to close the holes not occupied by the sticks. In addition to the sticks I also propose to have pivoted pieces E under the bottom, to be turned up vertically when the bottom is in the middle position, and laid down when the bottom is down, and having a pivot-bolt, F, contrived to clamp them fast in either position. In the upper position the pins C will be sufficient to hold the weight of the contents. G is a partition for dividing the measure in two halves. It may also be held by pins. Pins are only arranged on three sides, leaving one side free to lie on the floor for scraping in the contents.

Having thus described my invention, I claim as new and desire to secure by Letters Patent—

1. The combination of box A, movable bottom B, pins C, and turning-sticks D, substantially as specified.

2. The combination of pivoted pieces E with the box A and movable bottom B, substantially as specified.

CHARLES PLEASANT SULLIVAN, JR.

Witnesses:
JAMES LEWIS MCCULLOUGH,
W. F. MONROE,
JAMES W. BROWN.